United States Patent
Koju et al.

(10) Patent No.: US 8,869,128 B2
(45) Date of Patent: Oct. 21, 2014

(54) COMPILING METHOD, PROGRAM, AND INFORMATION PROCESSING APPARATUS

(71) Applicant: International Business Machines Corporation, Armonk, NY (US)

(72) Inventors: Toshihiko Koju, Kanagawa (JP); Ali I Sheikh, Markham (CA); Xin Tong, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 13/755,020

(22) Filed: Jan. 31, 2013

(65) Prior Publication Data

US 2013/0198498 A1    Aug. 1, 2013

(30) Foreign Application Priority Data

Feb. 1, 2012    (JP) ................. 2012-019524

(51) Int. Cl.
*G06F 9/45* (2006.01)
*G06F 9/30* (2006.01)
*G06F 9/455* (2006.01)

(52) U.S. Cl.
CPC .......... *G06F 9/3005* (2013.01); *G06F 9/45516* (2013.01)
USPC ......................................... 717/152; 717/146

(58) Field of Classification Search
CPC . G06F 9/3005; G06F 9/45516; G06F 8/4442; G06F 12/1441; G06F 21/52
USPC ................................................ 717/146, 152
See application file for complete search history.

(56) References Cited

U.S. PATENT DOCUMENTS

| | | | | |
|---|---|---|---|---|
| 6,161,217 A | * | 12/2000 | Detlefs et al. | 717/141 |
| 7,404,182 B1 | * | 7/2008 | Garthwaite et al. | 717/140 |
| 8,176,488 B1 | * | 5/2012 | Dobrovolskiy et al. | 718/1 |
| 2008/0184016 A1 | * | 7/2008 | Erlingsson et al. | 712/233 |
| 2009/0100254 A1 | * | 4/2009 | Moyer et al. | 712/227 |
| 2011/0078666 A1 | * | 3/2011 | Altekar | 717/131 |

FOREIGN PATENT DOCUMENTS

JP    2002-259135    9/2002

OTHER PUBLICATIONS

Bala et al., "Dynamo: A Transparent Dynamic Optimization System," ACM, 2000, 12pg.*
Jeang et al., "A Single-Stream Pipelined Instruction Decompression System for Embedded Microprocessors," IEEE, 2006, 4pg.*
Hiser et. al., "Evaluating Indirect Branch Handling Mechanisms in Software Dynamic Translation Systems," Paper, Mar. 2007, pp. 61-73, International Symposium on CGO '07.

* cited by examiner

*Primary Examiner* — Ryan Coyer
(74) *Attorney, Agent, or Firm* — Vazken Alexanian (57) ABSTRACT

A method, program, and apparatus for optimizing compiled code using a dynamic compiler. The method includes the steps of: generating intermediate code from a trace, which is an instruction sequence described in machine language; computing an offset between an address value, which is a base point of an indirect branch instruction, and a start address of a memory page, which includes a virtual address referred to by the information processing apparatus immediately after processing a first instruction; determining whether an indirect branch instruction that is subsequent to the first instruction causes processing to jump to another memory page, by using a value obtained from adding the offset to a displacement made by the indirect branch instruction; and optimizing the intermediate code by using the result of the determining step.

15 Claims, 8 Drawing Sheets

```
compute branch-target-virtual-address;
check page crossing if ((branch-target-virtual-address & ~0xfff) == (current-virtual-pc & ~0xfff) # to the same page
    && (current-physical-pc-on-trace & ~0xfff) == (next-physical-pc-on-trace & ~0xfff))
    if (( branch-target-virtual-address & 0xfff) == (next-physical-pc-on-trace & 0xfff))
        continue execution on trace;
    else
        side-exit trace;
else # to the other page
    translate branch-target-virtual-address to branch-target-physical-address
    if (translation succeeded)
        if (branch-target-physical-address == next-physical-pc-on-trace)
            continue execution on trace;
        else
            side-exit trace;
    else
        side-exit trace;
```

FIG. 8

COMPILING METHOD, PROGRAM, AND INFORMATION PROCESSING APPARATUS

CROSS-REFERENCE TO RELATED APPLICATION

This application claims priority under 35 U.S.C. §119 from Japanese Patent Application 2012-019524 filed on Feb. 1, 2012, the entire contents of which are incorporated herein by reference.

BACKGROUND OF THE INVENTION

1. Field of the Invention

The present invention relates to an optimization technique for dynamic compile processing in which a program is compiled during execution of the program. More specifically the present invention relates to a compiling method, a program and an information processing apparatus for a dynamic compiler to optimize compiled code.

2. Description of the Related Art

Conventionally, virtual machines (VMs) emulate computer operations and some are configured such that an interpreter interprets machine code at a low speed; then a dynamic compiler generates intermediate code from a trace, which is an instruction sequence described in the machine language, optimizes the intermediate code, and generates compiled code from the optimized intermediate code; and then the interpreter executes the compiled code.

Generally, the compilation target machine code contains various branch instructions, such as a relative branch instruction and an indirect branch instruction. A relative branch instruction designates a branch target by using an offset from the address of the relative branch instruction. An indirect branch instruction designates a branch target by using a value of a register incorporated in a processor such as a CPU and an offset from the value of the register.

The value of the register used in an indirect branch instruction varies at every run of the program. In addition, the virtual machine maps a physical address to a virtual address that also varies at every run of program. For these reasons, when the compilation target machine code contains an indirect branch instruction the compiled code needs to be run while checking whether an address predicted as a branch target of the indirect branch instruction matches with a memory address of a branch target that the processing is actually branched to (referred to as an actual branch target).

In this respect, Japanese Patent Application Publication No. 2002-259135 discloses a compilation optimization method using guard code for checking whether a memory address of an actual branch target matches a memory address predicted as a branch target of an indirect branch instruction. In such a conventional optimization method guard code, as shown in FIG. 8, is embedded in compiled code and thereby the compiled code is run while checking whether the memory address of the actual branch target matches the memory address predicted as the branch target of an indirect branch instruction.

Figure 8:
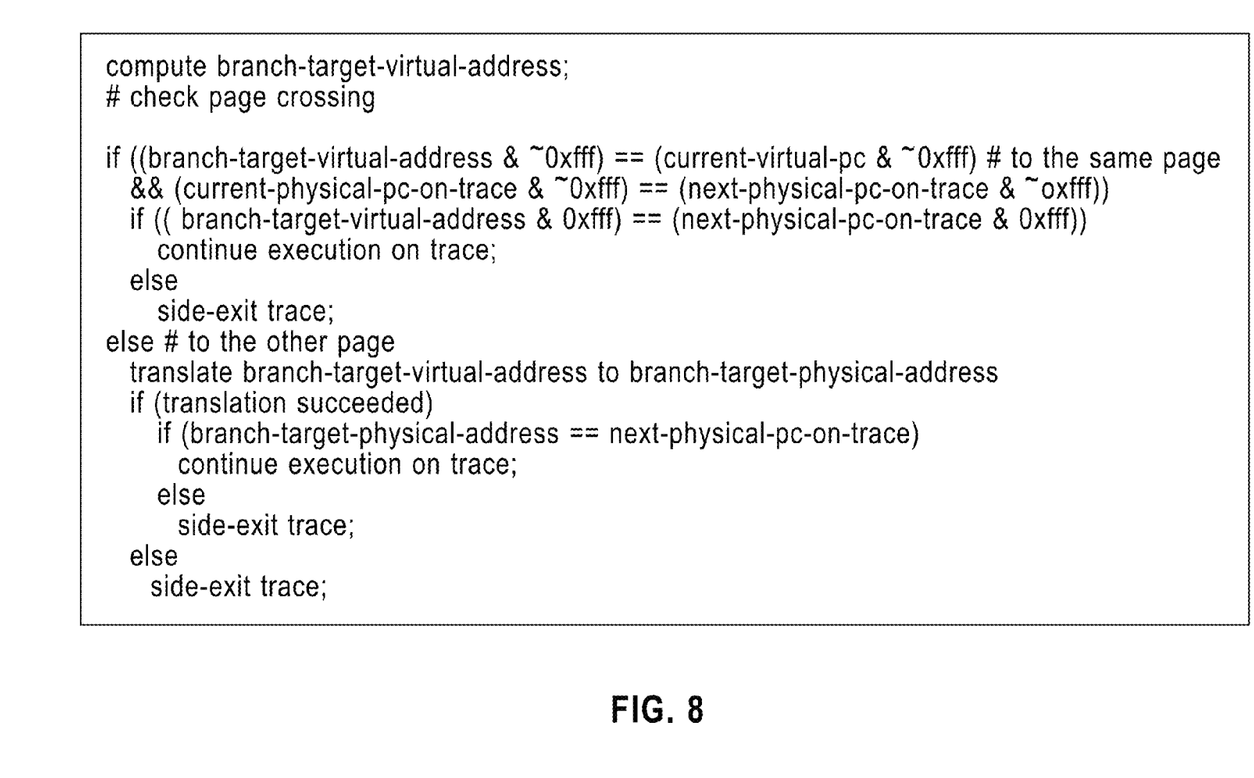
FIG. 8 shows guard code used in conventional compile processing.

Herein below FIG. 8 is referred to. Guard code, as shown in FIG. 8, is used to determine whether the virtual page address (branch-target-virtual-address&~0xfff) of the actual branch target and the current virtual page address (current-virtual-pc&~0xfff) are the same to thereby determine whether the indirect branch instruction causes page boundary crossing. If the indirect branch instruction does not cause page boundary crossing, it is determined whether a page offset address (branch-target-virtual-address & 0xfff) of the virtual address of the actual branch target matches with a page offset address (next-physical-pc-on-trace & 0xfff) of the branch address predicted as the branch target of the indirect branch instruction. If these addresses match with each other, that is, if the branch prediction succeeds, the execution of the compiled code is continued. On the other hand, if the addresses do not match with each other, the execution of the compiled code is terminated (side-exit trace). But if the indirect branch instruction does cause page boundary crossing the virtual address of the actual branch target is converted into a physical address corresponding to the virtual address. Then it is determined whether the physical address matches with a physical address predicted as the branch target of the indirect branch instruction. If these addresses match with each other, the execution of the compiled code is continued. If the addresses do not match with each other, the execution of the compiled code is terminated (side-exit trace).

However, the optimization method described in Japanese Patent Application Publication No. 2002-259135 requires guard code to be embedded in compiled code for each indirect branch instruction. As shown, the guard code is used to check whether an address predicated as a branch target of the indirect branch instruction matches with a memory address of the actual branch target. For this reason, in every run of compiled code, the guard code can cause a delay in the execution processing of the program due to an increase in CPU load, and also can lead to wasteful consumption of memory.

The present invention has been made to solve the foregoing problems, and has an objective to provide a compiling method, a program and an information processing apparatus that are capable of lowering CPU load and decreasing memory consumption by reducing pieces of guard code each of which is to be embedded in compiled code for an indirect branch instruction included in machine code to be compiled.

SUMMARY OF THE INVENTION

The present invention provides a compiling method executed by an information processing apparatus for compiling a trace. The method includes the steps: generating an intermediate code from the trace, which is an instruction sequence described in machine language; computing an offset between (i) an address value, which is a base point of an indirect branch instruction, and (ii) a start address of a memory page, which includes a virtual address referred to by the information processing apparatus, where the virtual address is referred to immediately after processing a first instruction contained in the intermediate code; determining whether a second indirect branch instruction, which is subsequent to the first instruction, causes processing to jump from a memory page that includes the second indirect branch instruction to another memory page by using a value obtained from adding the offset to a displacement made by the second indirect branch instruction, wherein the determining step obtains a result; and optimizing the intermediate code, using the result of the determining step, by deleting from the intermediate code processing of determining whether the second indirect branch instruction causes page boundary crossing; where at least one of the steps is carried out by the information processing apparatus.

The present invention also provides a program as an article of manufacture tangibly embodying computer readable instructions. When implemented the computer readable instructions cause an information processing apparatus to execute a compiling method for compiling a trace, which includes the steps of: generating an intermediate code from the trace, which is an instruction sequence described in machine language; computing an offset between (i) an address value, which is a base point of an indirect branch instruction, and (ii) a start address of a memory page, which includes a virtual address referred to by the information processing apparatus, where the virtual address is referred to immediately after processing a first instruction contained in the intermediate code; determining whether a second indirect branch instruction, which is subsequent to the first instruction, causes processing to jump from a memory page that includes the second indirect branch instruction to another memory page by using a value obtained from adding the offset to a displacement made by the second indirect branch instruction, where the determining step obtains a result; and optimizing the intermediate code, using the result of the determining step, by deleting from the intermediate code processing of determining whether the second indirect branch instruction causes page boundary crossing.

The present invention further provides an information processing apparatus for compiling a trace. The apparatus includes an interpreter configured to generate intermediate code from the trace, which is an instruction sequence described in machine language; and a dynamic compiler configured to compile intermediate code, where the dynamic compiler comprises an optimization processor configured to: compute an offset between (i) an address value, which is a base point of an indirect branch instruction, and (ii) a start address of a memory page, which includes a virtual address referred to by the information processing apparatus, where the virtual address is referred to immediately after processing a first instruction contained in the intermediate code; determine whether a second indirect branch instruction, which is subsequent to the first instruction, causes processing to jump from a memory page that includes the second indirect branch instruction to another memory page by using a value obtained from adding the offset to a displacement made by the second indirect branch instruction, where the optimization processor obtains a result; and optimize said intermediate code, using the result, by deleting from the intermediate code processing of determining whether the second indirect branch instruction causes page boundary crossing.

The present invention can lower CPU load and decrease memory consumption by reducing pieces of guard code each of which is to be embedded in compiled code for an indirect branch instruction included in machine code to be compiled.

DETAILED DESCRIPTION OF THE PREFERRED EMBODIMENTS

As described hereinabove, the compiling method includes the steps, executed by the information processing apparatus, of: generating intermediate code from the trace; computing an offset between an address value that is a base point of an indirect branch instruction, and a start address of a memory page that includes a virtual address to be referred to by the information processing apparatus immediately after processing a first instruction contained in the intermediate code; determining whether a second indirect branch instruction that is subsequent to the first instruction causes processing to jump from a memory page, which the second indirect branch instruction is allocated at, to another memory page by using a value obtained by adding the offset and a displacement to be made by the second indirect branch instruction; and optimizing the intermediate code, based on the result of the determining step, by deleting, from the intermediate code, processing of determining whether the second indirect branch instruction causes page boundary crossing.

Figure 1:
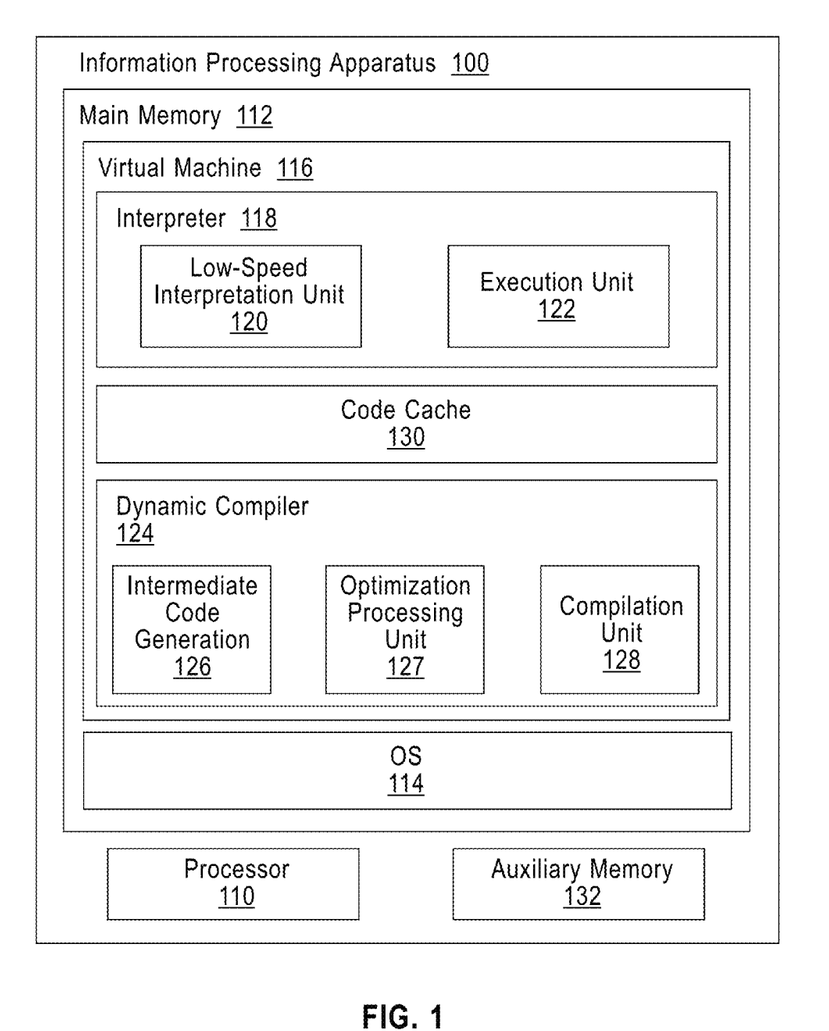
FIG. 1 shows a hardware configuration and a functional configuration of an information processing apparatus configured to execute a program of the present invention.

Herein below, the present invention will be described by using embodiments, but is not limited to the embodiments to be described below. Referring to FIG. 1, a hardware configuration is shown, as well as a functional configuration of an information processing apparatus 100, which is configured to execute a program of the present invention. Herein below, the information processing apparatus 100 will be described by referring to FIG. 1.

The information processing apparatus 100 is an information processor capable of executing programs described in various program languages such as JAVA (registered trademark), JAVA SCRIPT (registered trademark), C, C++, assemblers, PERL, PHP, RUBY, and PYTHON. The information processing apparatus 100 executes a device-readable program of the present invention described in a programming language under the control of an operating system (OS), which is described later, to thereby implement functions, which are described later, on the information processing apparatus 100. The information processing apparatus 100 includes a processor 110, a main memory 112, and an auxiliary memory 132.

The processor 110 is a processing unit which performs overall control of the information processing apparatus 100, such as a central processing unit (a CPU) or a micro processing unit (an MPU). The processor 110 includes registers (not shown) that hold addresses of the main memory 112. The main memory 112 is a memory, such as a RAM, which provides a memory space for executing the program of the present invention. The auxiliary memory 132 is a memory that sustainably holds programs, data, and the like, such as a hard disk drive (an HDD) or a flash memory. The processor 110 executes the program of the present invention, which is read from the auxiliary memory 132 and loaded to the main memory 112. Thereby, the processor 110 loads an operating system (OS) 114 and a virtual machine 116 to the main memory 112.

The OS 114 is software that provides basic functions of the information processing apparatus 100. Various OSs can be employed in this embodiment, such as: Windows (registered trademark) 7, Windows Vista (registered trademark), Windows XP (registered trademark), Windows200X Server (registered trademark), Mac OS (registered trademark), UNIX (registered trademark), and LINUX (registered trademark).

The virtual machine 116 is an emulator that interprets machine code at a low speed, compiles the machine code, and executes the compiled code. The virtual machine 116 includes an interpreter 118, a dynamic compiler 124, and a code cache 130.

The interpreter 118 is a software module which interprets target machine code and executes compiled code. The interpreter 118 includes a low-speed interpretation unit 120 and an execution unit 122. The low-speed interpretation unit 120 interprets target machine code at the low speed. The low-speed interpretation unit 120 stores in the main memory 112, an instruction sequence of the interpreted machine code and a branch address indicating a branch target of an indirect branch instruction obtained during interpretation of the machine code. The execution unit 122 acquires compiled code from the code cache 130 which is a memory area where code compiled by the dynamic compiler 124 is stored, and then executes the compiled code.

The dynamic compiler 124 is a compiler which performs dynamic compilation. The dynamic compiler 124 includes an intermediate code generation unit 126, an optimization processing unit 127, and a compilation unit 128. A JIT compiler may be employed as the dynamic compiler 124 in this embodiment.

The intermediate code generation unit 126 generates intermediate code from the machine code stored in the main memory 112 by the interpreter 118. The intermediate code includes the guard code as shown in FIG. 8. The optimization processing unit 127 performs optimization processing on the intermediate code generated by the intermediate code generation unit 126. By performing the optimization processing on the intermediate code, the optimization processing unit 127 minimizes the number of pieces of the guard code, each of which is to be embedded in the compiled code. The optimization processing executed by the optimization processing unit 127 will later be described in detail with reference to FIGS. 3, 4, and 5. The compilation unit 128 compiles the intermediate code subjected to the optimization processing. The compilation unit 128 stores the compiled code in the code cache 130, which is the memory area where the compiled code should be stored.

Figure 2:
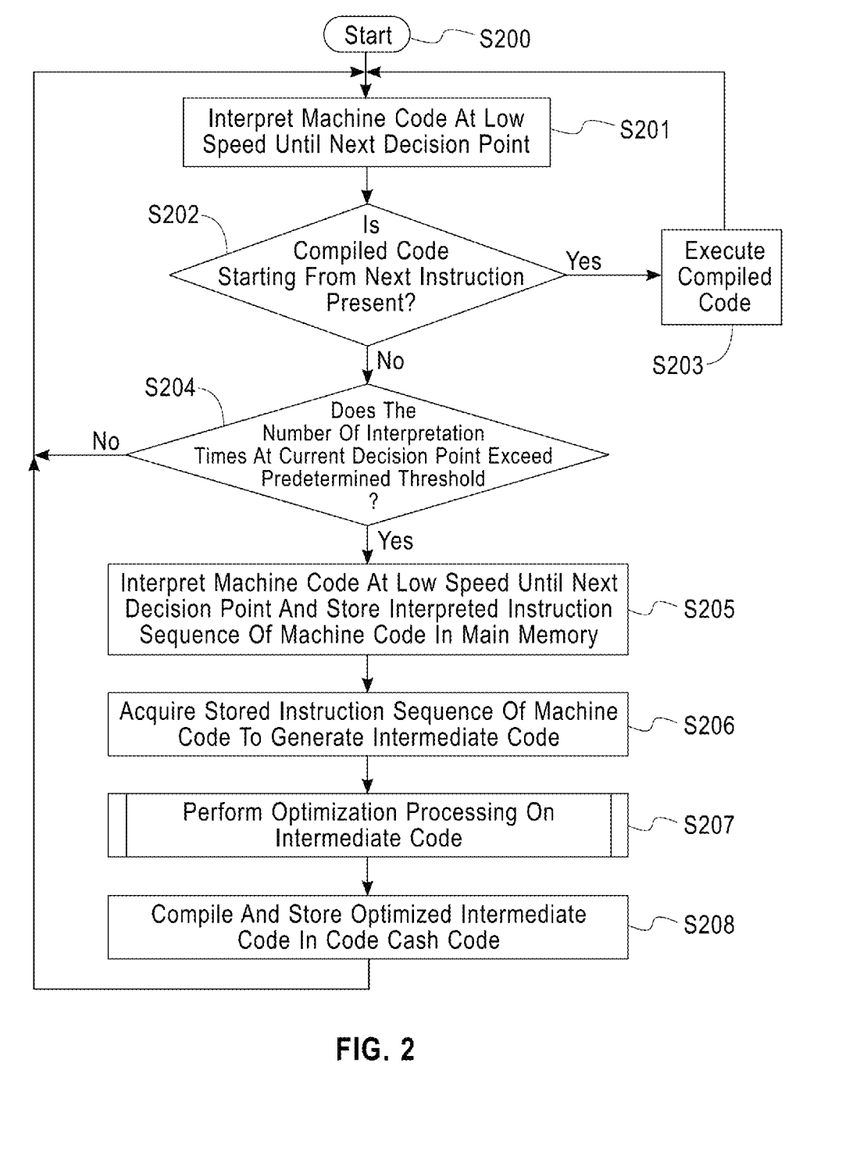
FIG. 2 is a flow chart showing an embodiment of processing executed by the information processing apparatus shown in FIG. 1.

FIG. 2 is a flowchart showing an embodiment of processing executed by the information processing apparatus 100 shown in FIG. 1. Herein below, the processing executed by the information processing apparatus 100 will be described with reference to FIG. 2.

The processing starts from Step S200. In Step S201, the low-speed interpretation unit 120 of the interpreter 118 of the virtual machine 116 reads target machine code from the auxiliary memory 132 and interprets the machine code at the low speed in a part of code from a predetermined decision point (a backward branch instruction, for example) to the next decision point.

In Step S202, the execution unit 122 of the interpreter 118 refers to the code cache 130 to determine whether a piece of compiled code starting from a next instruction is present in the code cache 130. If the piece of compiled code is present (yes), the processing is branched to Step S203. In Step S203, the execution unit 122 executes the compiled code stored in the code cache 130. If it is determined in Step S202 that the piece of compiled code is not present (no), the processing is branched to Step S204.

In Step S204, the low-speed interpretation unit 120 determines whether the total number of interpretations at the current decision point, which are performed in Step S201, exceeds a predetermined threshold. In this embodiment, a number of any constant used by the dynamic compiler 124 is used as the predetermined threshold. If the number of interpretation times at the current decision point does not exceed the threshold (no), the processing is returned to Step S201. If the number of interpretation times at the current decision point exceeds the predetermined threshold (yes), the processing is branched to Step S205.

In Step S205, the low-speed interpretation unit 120 interprets the machine code at the low speed until the next decision point and stores, in the main memory 112, an instruction sequence of the interpreted machine code and an actual branch address to which the processing is branched in interpreting the indirect branch instruction.

In Step S206, the dynamic compiler 124 acquires the instruction sequence of the machine code stored by the low-speed interpretation unit 120 from the main memory 112 to generate intermediate code. In Step S207, the dynamic compiler 124 performs the optimization processing, which is later explained in detail with reference to FIG. 3, on the intermediate code. In Step S208, the dynamic compiler 124 compiles the intermediate code subjected to the optimization processing and stores the compiled code in the code cache 130. Thereafter, the processing in and after Step S201 are executed again.

Figure 3:
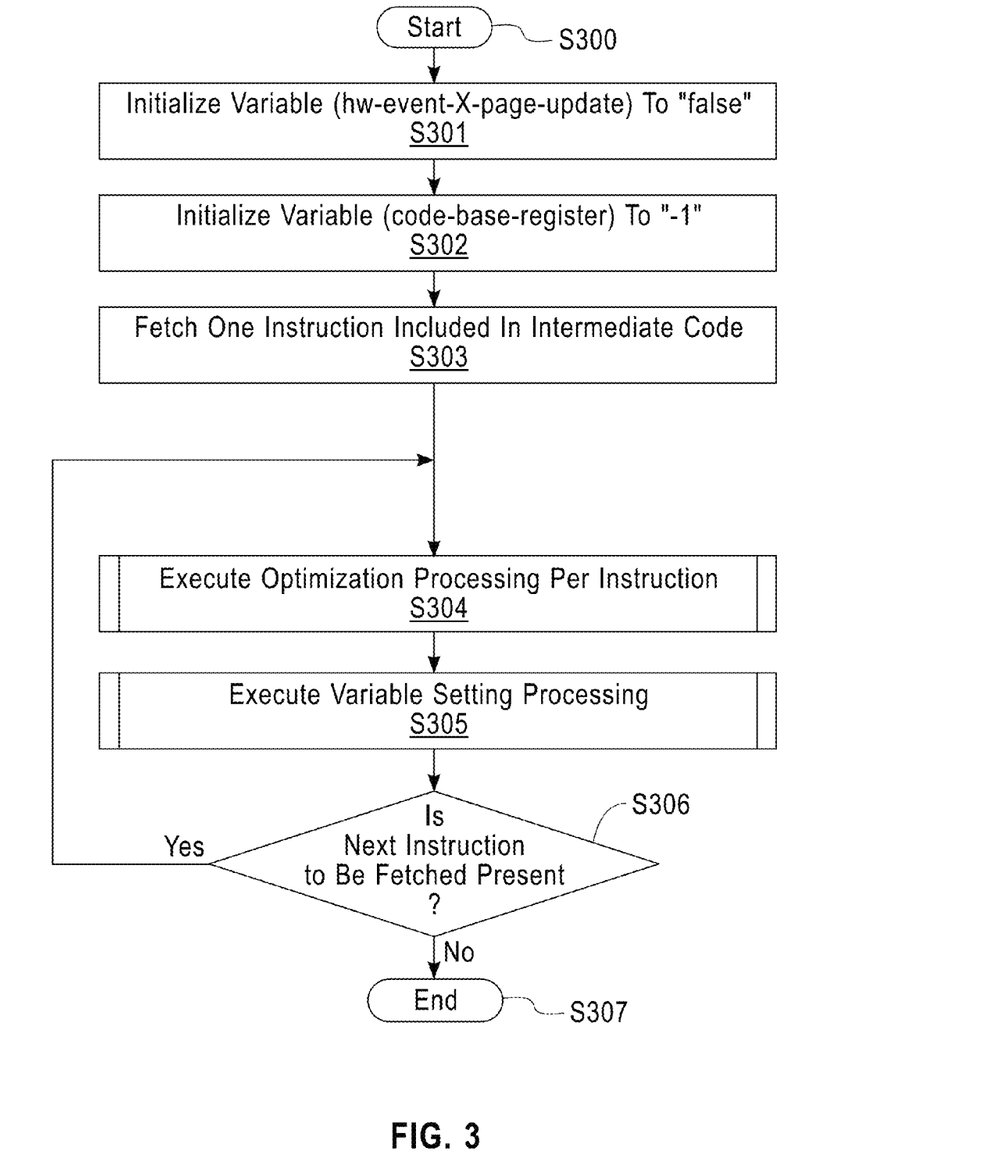
FIG. 3 is a flowchart showing optimization processing executed by a dynamic compiler of the present invention.

FIG. 3 is a flowchart showing the optimization processing executed by the dynamic compiler 124 of the present invention. Herein below, the optimization processing of the intermediate code will be described with reference to FIG. 3.

The processing executed by the dynamic compiler 124 starts from Step S300. In Step S301, the optimization processing unit 127 of the dynamic compiler 124 initializes a variable (hw-event-X-page-updated) to "false", the variable being provided for each of HW events X to be optimized. In Step S302, the optimization processing unit 127 initializes a variable (code-base-register) to an invalid value "−1". In Step S303, the optimization processing unit 127 fetches an instruction included in the intermediate code. In Step S304, the optimization processing unit 127 executes the optimization processing, which is later explained in detail with reference to FIG. 4, on the fetched instruction. The optimization processing is executed on an instruction basis. In Step S305, the optimization processing unit 127 executes variable setting processing, which is later explained in detail with reference to FIG. 5, on the fetched instruction. In Step S306, the optimization processing unit 127 determines whether a next instruction to be fetched is present. If the next instruction to be fetched is present (yes), the processing is returned to Step S304. If the next instruction to be fetched is not present (no), the processing is branched to Step S307 to be terminated.

Figure 4:
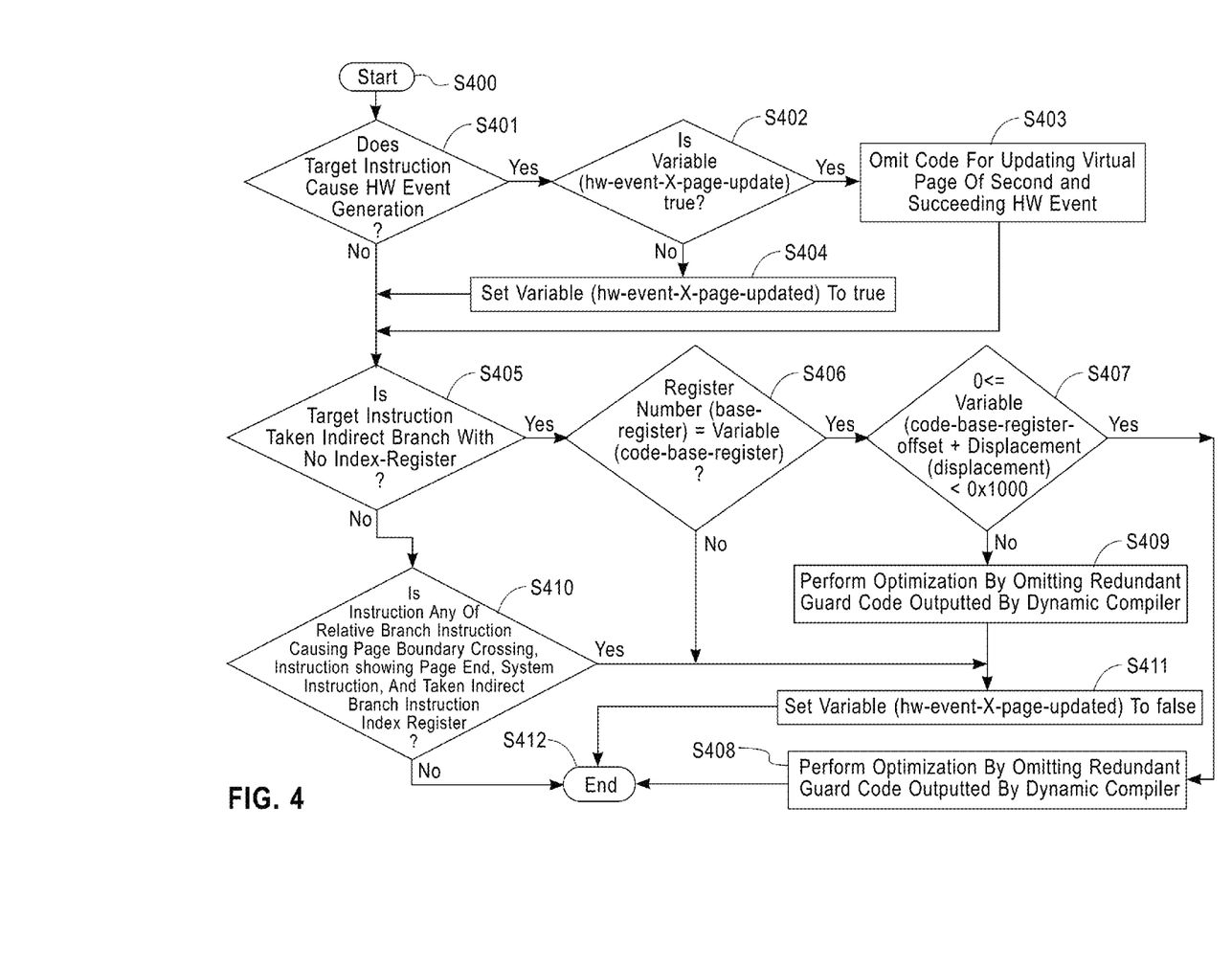
FIG. 4 is a flowchart showing optimization processing executed by the dynamic compiler of the present invention.

FIG. 4 is a flowchart showing the optimization processing executed by the dynamic compiler of the present invention. Herein below, the optimization processing which is executed on the intermediate code on the instruction basis by the dynamic compiler 124 will be described with reference to FIG. 4.

The optimization processing shown in FIG. 4 starts from Step S400. In Step S401, the dynamic compiler 124 determines whether a HW event requesting the storing of a current virtual address is generated according to a processing target instruction. The HW event is an event in which the current virtual address is stored and occurs in hardware emulated by the virtual machine 116. For example, in z/Architecture, a HW event occurs according to a branch instruction such as a taken indirect branch instruction with no index-register, a taken relative branch instruction or a taken indirect branch instruction with index register. If it is determined in Step S401 that the HW event is not generated (no), the processing is branched to Step S405. If it is determined in Step S401 that the HW event is generated (yes), the processing is branched to Step S402.

In Step S402, the dynamic compiler 124 determines whether a value of the variable (hw-event-X-page-updated) is "true". If the variable (hw-event-X-page-updated) is "true" (yes), the processing is branched to Step S403. In Step S403, the dynamic compiler 124 omits any redundant piece of code to update virtual pages of the second and succeeding HW event for the processing target instruction in the intermediate code generated by the intermediate code generation unit 126. The code to update a virtual page of an HW event results in processing of storing an address of a virtual page at a memory address indicating an internal data area of the emulated CPU. The code is executed at timing of emulating the instruction for generating the HW event. If the value of the variable (hw-event-X-page-updated) is not "true" (no), the processing is branched to Step S404. In Step S404, the dynamic compiler 124 sets the variable (hw-event-X-page-updated) to "true". Following either Step 403 or Step 404, the processing is branched to Step 405. In Step S405, the dynamic compiler 124 determines whether the processing target instruction is the taken indirect branch instruction with no index-register.

Note that an indirect branch instruction is a branch instruction in which one or more register values and a predetermined displacement are added to compute a branch target address. There are two types of indirect branch instructions. Specifically, to compute a branch target address, one type of indirect branch instruction adds a value of one register (a base register) and a predetermined displacement, while the other type adds values of the base register, another register (an index register) and a predetermined displacement. In the present invention, the former is referred to as an indirect branch instruction with no index-register, and the latter is referred to as an indirect branch instruction with index register. In addition, a base register used for an indirect branch instruction is referred to as a code base register.

In Step S405, if it is determined that the target instruction is not the taken indirect branch instruction with no index-register (no), the processing is branched to Step S410, but if it is determined that the target instruction is the taken indirect branch instruction with no index-register (yes), the processing is branched to Step S406.

In Step S406, the dynamic compiler 124 determines whether a register number (base-register) of a base register used for the indirect branch instruction matches a value of a variable (code-base-register) that is set in the variable setting processing, which is later explained in detail with reference to FIG. 5. If these match with each other (yes), the processing is branched to Step S407. If these do not match with each other (no), the processing is branched to Step S411.

Figure 5:
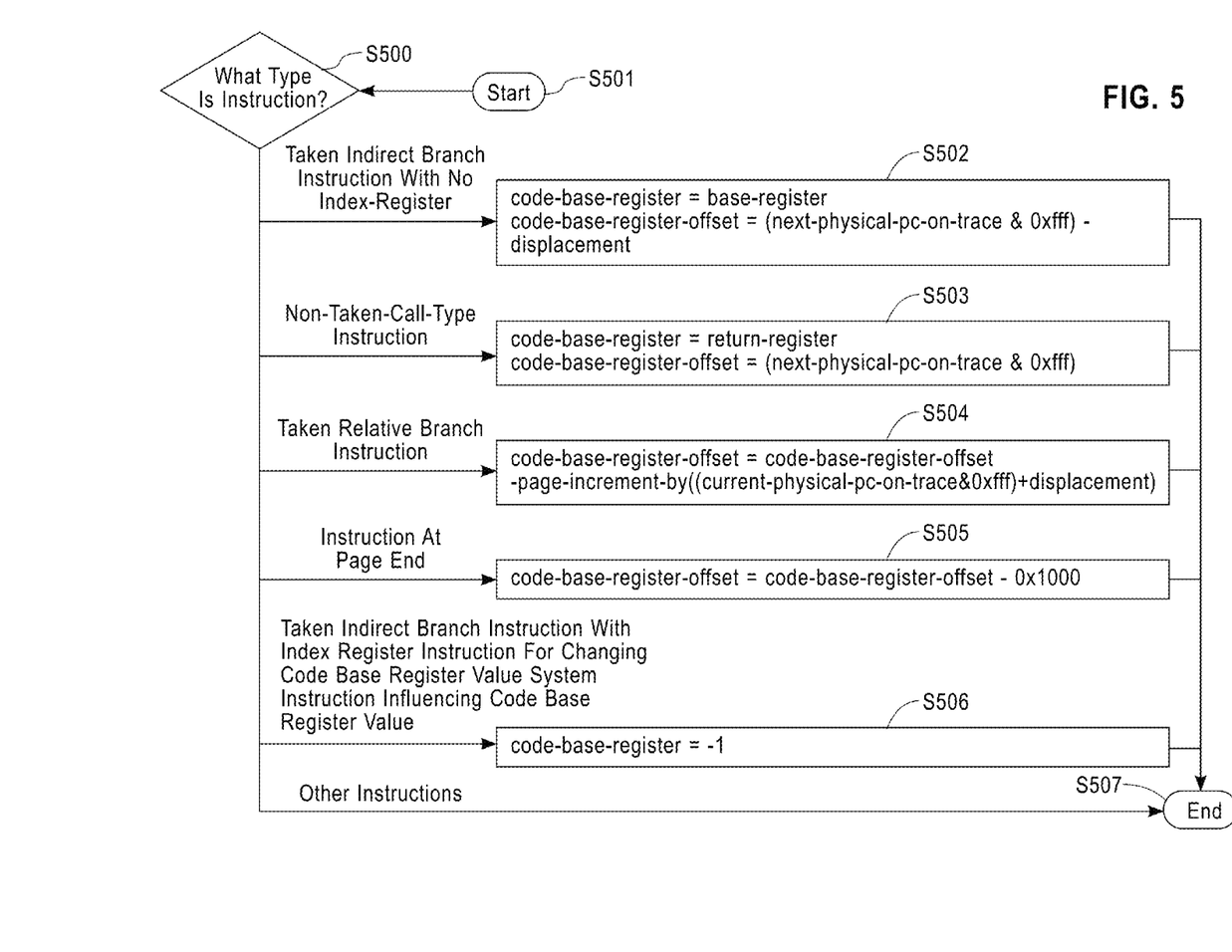
FIG. 5 is a flowchart showing variable setting processing executed by the dynamic compiler of the present invention.

In Step S407, the dynamic compiler 124 determines whether a value obtained by adding a predetermined displacement and a value of a variable (code-base-register-offset), which is assigned in the variable setting processing explained later in detail with reference to FIG. 5, is equal to or larger than zero but smaller than a memory size of "0x1000", which is the size of one virtual memory page in this embodiment, but any size can be set as the page size, depending on the architecture. Thereby, the dynamic compiler 124 can determine whether the target instruction causes page boundary crossing. Specifically, if the value obtained by the addition is equal to or larger than zero and smaller than a memory size of "0x1000", the dynamic compiler 124 determines that the instruction does not cause page boundary crossing. If the value is smaller than zero or larger than the memory size of "0x1000", the dynamic compiler 124 determines that the instruction causes page boundary crossing and the processing is branched to Step 409. If the instruction does not cause page boundary crossing (yes), the processing is branched to Step S408 in which the dynamic compiler 124 omits any redundant piece of the guard code to be outputted and thereby optimizes the guard code. Following Step S408 the processing is branched to Step S412 in which the processing is terminated.

In this embodiment, by using the value obtained by adding the value of the aforementioned variable (code-base-register-offset) and the predetermined displacement, the dynamic compiler 124 determines during compilation whether the indirect branch instruction causes page boundary crossing, as shown in Step S407. Thus, in the optimization processing shown in Step S408, redundant processing of determining whether the indirect branch instruction causes page boundary crossing can be omitted in the guard code to be outputted by the dynamic compiler 124. Specifically, the redundant processing in the guard code, an example of which is shown in FIG. 8, which compares the page that includes the virtual address of the branch target (branch-target-virtual-address&~0xfff) with the page that includes the current virtual address (current-virtual-pc&~0xff) can be omitted.

In addition, in the optimization processing shown in Step S408, redundant processing of comparing page offset addresses can be omitted in the guard code to be outputted by the dynamic compiler 124. This is because it is guaranteed that 12 lower bits of a register having the register number shown by the variable (code-base-register) set in the variable setting processing, which is later explained in detail with reference to FIG. 5, is a constant. Specifically, the redundant processing in the guard code, an example of which is shown in FIG. 8, which compares 12 lower bits (branch-target-virtual-address&0xfff) of the virtual address of the branch target with 12 lower bits (next-physical-pc-on-trace&0xfff) of a branch address predicted as the branch target can be omitted.

Furthermore, a positive result (yes) from the processing in Step S407 proves that the branch is performed within the same virtual page. Thus, in the optimization processing shown in Step S408, redundant processing in which a virtual page address part of a program counter of the emulated CPU is updated to a virtual page address part of the branch target can be omitted in the intermediate code generated by the intermediate code generation unit 126. On the other hand, if it is determined in Step S407 that the instruction causes page boundary crossing (no), the processing is branched to Step S409.

In Step S409, the dynamic compiler 124 omits any redundant piece of the guard code to be outputted and thereby optimizes the guard code. Specifically, in the optimization processing in Step S409 redundant processing of determining whether the indirect branch instruction causes page boundary crossing is omitted in the guard code outputted by the dynamic compiler 124. Step 407 determines whether the indirect branch instruction causes page boundary crossing by using the value obtained from adding the value of the aforementioned variable (code-base-register-offset) and the predetermined displacement.

Additionally, in Step S409 conversion processing is carried out by converting the conversion processing of the branch target address and the evaluation processing of the branch address, which are included in the guard code to be outputted by the dynamic compiler 124, into conversion processing of the page that includes the branch target address and evaluation processing of the page that includes the branch target address. Specifically, conversion processing of the branch target address (translate branch-target-virtual-address to branch-target-physical-address) in the conventional guard code shown in FIG. 8 is converted into conversion processing of the page that includes the branch target address (translate branch-target-virtual-page-address to branch-target-physical-page-address). This causes the conversion processing to now convert the page that includes the virtual address of the branch target into the page that includes the physical address of the branch target. In addition, evaluation processing of the branch address (branch-target-physical-address==next-physical-pc-on-trace) in the conventional guard code shown in FIG. 8 is converted into evaluation processing of the page that includes the branch target address (branch-target-physical-page-address==next-physical-pc-on-trace&~0xff). This causes the evaluation processing to now determine whether the page that includes the physical address of the branch target matches with the page that includes a predicted address of the branch target.

To put the conversion processing that occurs in Step 409 in more detail: the conversion processing of the branch target address (translate branch-target-virtual-address to branch-target-physical-address) in the conventional guard code carries out conversion processing of the branch target page address (translate branch-target-virtual-page-address to branch-target-physical-page-address) and carries out processing of setting a value, which is calculated using the page that includes the physical address of the branch target and the virtual address (12 lower bits) of the branch target, as the physical address of the branch target (branch-target-physical-address=branch-target-physical-page-address+(branch-target-virtual-address&0xfff)). Then, the evaluation processing of the branch address (branch-target-physical-address==next-physical-pc-on-trace) compares values that are 12 lower bits. In this embodiment, since the 12 lower bits of the register having the register number shown by the variable (code-base-register) is a constant, it is not necessary to perform conversion processing of a page offset part (branch-target-physical-address=branch-target-physical-page-address+(branch-target-virtual-address&0xff)) and evaluation processing of the page offset part (branch-target-physical-address==next-physical-pc-on-trace), which are required in the conventional guard code.

If it is determined in Step S405 that the target instruction is not the taken indirect branch instruction with no index-register (no), the processing is branched to Step S410. In Step S410, the dynamic compiler 124 determines whether the target instruction falls under any one of (1) a relative branch instruction causing page boundary crossing, (2) an instruction present at the end of a page, (3) a system instruction influencing the variable (hw-event-X-page-updated) (such as address mode change to change the address size (32 bits, 64 bits or the like)), or (4) the taken indirect branch instruction with index register. If it is determined in Step S410 that the target instruction falls under one of the aforementioned instructions (yes), the processing is branched to Step S411. In Step S411, the variable (hw-event-X-page-updated) is initialized to "false". If it is determined in Step S410 that the target instruction does not fall under one of the instructions (no), the processing is branched to Step S412 to be terminated.

FIG. 5 is a flowchart showing the variable setting processing executed by the dynamic compiler of the present invention. Referring to FIG. 5, a description is given below of the variable setting processing in which the dynamic compiler 124 sets the variables used in the optimization processing shown in FIG. 4. The processing shown in FIG. 5 is started from Step S500. In Step S501, the dynamic compiler 124 branches the processing according to the type of the target instruction.

If in Step 501 it is determined that the target instruction is the taken indirect branch with no index-register for computing a branch target address (for example, a conditional branch such as a branch on condition (BC) that is a machine language instruction used in z/Architecture), the processing is branched to Step S502. In Step S502, the dynamic compiler 124 sets the register number (base-register) of a base register for the indirect branch instruction, as the variable (code-base-register) that has a code base register value set therein. Then, the dynamic compiler 124 subtracts a predetermined displacement from a value of the 12 lower bits of the predicted branch address (next-physical-pc-on-trace), which is the branch target of the indirect branch instruction interpreted at the low speed and stored in the main memory 112 by the interpreter 118. Then, the dynamic compiler 124 assigns the obtained value to the variable (code-base-register-offset). Then, the processing is moved to Step S507 to be terminated. The variable (code-base-register-offset) is an offset between a value of an address that is a base point of the indirect branch instruction and a start address of a memory page that includes a virtual address referred to by the information processing apparatus 100 immediately after processing a compilation target instruction. The variable (code-base-register-offset) is used in the aforementioned processing of determining in Step S407 whether the target instruction causes page boundary crossing.

If it is determined in Step S501 that the target instruction is a non-taken-call-type instruction (such as BALR which is a machine language instruction used in z/Architecture) the processing is branched to Step S503. The non-taken-call-type instruction is an instruction for loading a return address to a register without branching. In Step S503, the dynamic compiler 124 sets, as the variable (code-base-register), the register number (return-register) of a return register having a return address set therein that is a parameter of a call instruction. Then, the dynamic compiler 124 assigns a value of 12 lower bits of the return address set in the return register (next-physical-pc-on-trace&0xfff) to the variable (code-base-register-offset). Subsequently, the processing is moved to Step S507 to be terminated.

If it is determined in Step S501 that the target instruction is a taken relative branch instruction (such as a branch relative on condition (BRC) which is a machine language instruction used in z/Architecture), the processing is branched to Step S504. In Step S504, the dynamic compiler 124 computes a value by multiplying the number of page boundaries the relative branch instruction crossed by the memory size of one virtual page. This computation is carried out using a function of page-increment-by-((current-physical-pc-on-trace&0xff)+displacement). Then, the dynamic compiler 124 subtracts the multiplication value from a value set as the variable (code-base-register-offset), and assigns the resulting value to the variable (code-base-register-offset). Thereafter, the processing is moved to Step S507 to be terminated.

If it is determined in Step S501 that the target instruction is an instruction present at the end of the page, the processing is branched to Step S505. In Step S505, the dynamic compiler 124 assigns, to the variable (code-base-register-offset), a value obtained by subtracting the memory size of one virtual page (0x1000, for example) from the value of the variable (code-base-register-offset). Then, the processing is moved to Step S507 to be terminated.

If it is determined in Step S501 that the target instruction falls under any one of (1) the taken indirect branch instruction with index register for computing a branch target address by using a value of the index register, (2) an instruction for changing a value of the code base register, or (3) the system instruction influencing the value of the code base register, the processing is branched to Step S506. In Step S506, the dynamic compiler 124 sets the variable (code-base-register) to the invalid value "−1". If it is determined in Step S501 that the target instruction is any instruction other than the above, the processing is moved to Step S507 to be terminated.

Figure 6:
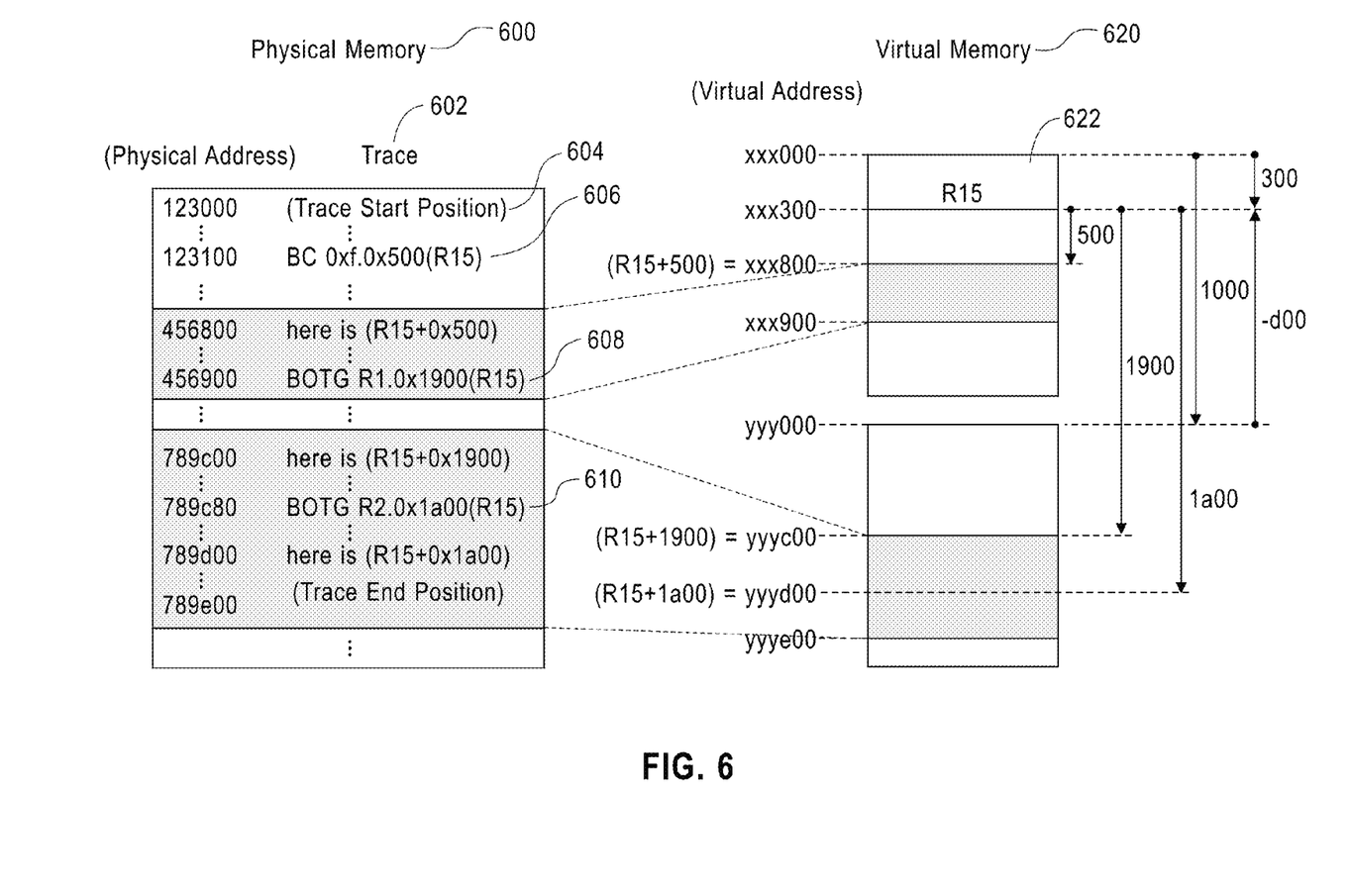
FIG. 6 is a conceptual diagram showing an embodiment of physical and virtual memory mapping executed by a virtual machine of the present invention.

FIG. 6 is a conceptual diagram showing an embodiment of physical and virtual memory mapping executed by the virtual machine of the present invention. Herein below, mapping of a physical memory 600 and a virtual memory 620 of a system emulated by the virtual machine will be described with reference to FIG. 6.

A trace 602 is an instruction sequence stored in the main memory 112 by the interpreter 118 after being interpreted at the low speed. The dynamic compiler 124 compiles the trace 602. In the embodiment shown in FIG. 6, the physical address (0x:456000) and the physical address (0x:789000) in the physical memory 600 are respectively mapped to a start address (0x:xxx000) of a virtual page 622 and a start address (0x:yyy000) of a virtual page 624 (x and y are any numbers) which are memory areas of the virtual memory 620. In the embodiment shown in FIG. 6, the virtual page 622 continues to the virtual page 624. Note that where to map a memory address varies at every run of the program.

The trace 602 shown in FIG. 6 is the instruction sequence interpreted at the low speed and stored by the interpreter 118. The trace 602 includes instructions and physical addresses of the physical memory 600 at which the instructions are loaded. The physical address (0x:123000) of the physical memory 600 is a start position 604 of the trace 602, and the first instruction of the instruction sequence stored by the interpreter 118 is loaded at that address.

A first indirect branch instruction (BC 0xf, 0x500(R15)) 606 is loaded at a physical address (0x:123100). By executing the first indirect branch instruction, processing is branched to a virtual address in the virtual memory 620. This virtual address is obtained by adding a virtual address that is a set value "R15" of the base register and a displacement "0x500". The set value "R15" is a parameter of the indirect branch instruction. Note that the virtual address set in "R15" varies at every run of an instruction. In this embodiment "R15" has a virtual address (0x:xxx300) set therein. For this reason, the indirect branch instruction causes the processing to branch to a virtual address (0x:xxx800). In other words, the first indirect branch instruction branches the processing to the physical address (0x:456800), which is a predicted address of the first indirect branch instruction.

A second indirect branch instruction (BCTG R1, 0x1900 (R15)) 608 is loaded to the physical memory 600 at a physical address (0x:456900). By executing the second indirect branch instruction 608, the processing is branched to a virtual address (0x:yyyc00) in the virtual memory 620. This virtual address is obtained by adding the virtual address (0x:xxx300), which is the set value "R15" of the code base register, and a displacement "0x1900". The set value "R15" is a parameter of the second indirect branch instruction 608.

In this embodiment, the virtual page 622 continues to the virtual page 624, and the memory size of the virtual page 622 is "0x:1000". Accordingly, a value of "0x:yyyc00" is obtained by adding a virtual address (0x:xxx300) and the displacement "0x:1900". This means that the second indirect branch instruction 608 causes the processing to move from the virtual address (0x:xxx900) in the virtual page 622 to the virtual address (0x:yyyc00) in the virtual page 624. In other words, the second indirect branch instruction 608 branches the processing to the physical address (0x:789c00) which is a predicted branch target address of the second indirect branch instruction.

Further, a third indirect branch instruction (BCTG R2, 0x1a00(R15)) 610 is loaded to the physical memory 600 at a physical address (0x:789c80). By executing the third indirect branch instruction 610, the processing is moved to a virtual address (0x:yyyd00) in the virtual memory 620. This virtual address is obtained by adding a virtual address (0x:xxx300), which is the set value "R15" of the code base register, and a displacement "0x1a00". The set value "R15" is a parameter of the third indirect branch instruction 610. In other words, the third indirect branch instruction causes the processing to branch to the physical address (0x:789d00) which is a predicted address of the third indirect branch instruction. Then, the processing is terminated at the physical address (0x:789e00) and the virtual address (0x:yyye00).

Referring to FIG. 3, the processing in Step S304 is performed on the first indirect branch instruction (BC 0xf, 0x500 (R15)) 606 while the variable (code-base-register) has the initial value of "−1". The processing in Step S304 is shown in detail in FIG. 4. Since the variable (code-base-register) and the register number (base-register) do not match, the optimization processing is not performed on the first indirect branch instruction 606. Consequently, the processing included in the guard code shown in FIG. 8 is not reduced. For this reason, when the compiled code is executed, a set value other than the virtual address (0x:xxx300) of "R15" leads to a failure of the branch prediction, and thus the guard code causes the execution of the compiled code to be terminated.

Referring to FIG. 3, the processing in Step S305 is performed on the first indirect branch instruction (BC 0xf, 0x500 (R15)) 606. The processing in Step S305 is shown in detail in FIG. 5. Referring to FIG. 5, in Step S502 the dynamic compiler 124 assigns to the variable (code-base-register-offset) a value obtained by subtracting a predetermined displacement from a value of 12 lower bits of a branch address (next-physical-pc-on-trace) predicted as the branch target of the first indirect branch instruction.

Specifically, in the first indirect branch instruction (BC 0xf, 0x500(R15)) 606, a value "0x:300" is computed by subtracting a displacement "0x:500" from a value "0x:800". The value "0x800" is obtained from the 12 lower bits of "0x: 456800", which is the branch address (next-physical-pc-on-trace) predicted as the branch target of the first indirect branch instruction. Then, the computed value "0x:300" is assigned to the variable (code-base-register-offset). Therefore, the computed value "0x:300" assigned to the variable (code-base-register-offset) corresponds to an offset (a difference) between the virtual address "0x:xxx300" and the start address "0x:xxx000", where the virtual address "0x:xxx300" is the set value (R15) when the first indirect branch instruction 606 would successfully be branched to the predicted address and the start address "0x:xxx000" of the virtual page 622 is an address of a page that includes the predicted branch target of the first indirect branch instruction 606.

Referring FIG. 3, when the processing in Step S304 is executed on the second indirect branch instruction (BCTG R1, 0x1900(R15)) 608, the register number (base-register) of the base register is set in the variable (code-base-register). The processing in Step S304 is shown in detail in FIG. 4. Also, in FIG. 3, when the processing in Step S305 is performed on the first indirect branch instruction 606, "0x:300" is set in the variable (code-base-register-offset). For this reason, Step S407 shown in FIG. 4 is executed. The processing in Step S305 is shown in detail in FIG. 5.

By determining whether a value obtained by adding the value "0x:300" of the variable (code-base-register-offset) and the displacement "0x:1900" is not smaller than zero and is smaller than the memory size (0x:1000) of one virtual page, the dynamic compiler 124 determines whether the second indirect branch instruction 608 causes the processing to jump from the current memory page to another memory page. In other words, execution of Step S407 determines whether the second indirect branch instruction 608 causes page boundary crossing.

In this embodiment, the value obtained by adding the value "0x:300" of the variable (code-base-register-offset) and the displacement "0x:1900" is "0x:1c00". Thus, the dynamic compiler 124 determines in Step S407 that the second indirect branch instruction 608 causes page boundary crossing, and thus executes the aforementioned optimization processing in Step S409. Thereby, when the compiled code is executed, the conversion processing (translate branch-target-virtual-page-address to branch-target-physical-page-address) of the page that includes the branch target address of the second indirect branch instruction and the evaluation processing (branch-target-physical-page-address==next-physical-pc-on-trace&~0xfff) of the page that includes the branch target address of the second indirect branch instruction are executed. If there is no mapping between the virtual address "0x:yyy000" and the physical address "0x:789000", the branch prediction fails and the guard code causes the execution of the compiled code to be terminated.

Referring to FIG. 3, the processing in Step S305 is performed on the second indirect branch instruction (BCTG R1, 0x1900(R15)) 608, a value "0x:−d00" is computed by subtracting the displacement "0x:1900" from a value "0x:c00" of 12 lower bits of the branch address (next-physical-pc-on-trace) "0x:789c00" predicted as the branch target of the second indirect branch instruction, and the computed value is assigned to the variable (code-base-register-offset). Therefore, the computed value "0x:−d00" assigned to the variable (code-base-register-offset) corresponds to an offset between the virtual address "0x:xxx300" and the start address "0x:yyy000". The processing in Step S305 is shown in detail in FIG. 5. The virtual address "0x:xxx300" is the set value (R15) when the second indirect branch instruction 608 would successfully be branched to the predicted address. The start address "0x:yyy000" of the virtual page 624 is an address of a page that includes the predicted branch target of the second indirect branch instruction 608.

Referring to FIG. 3, when the processing in Step S304, which is shown in detail in FIG. 4, is executed on the third indirect branch instruction (BCTG R2, 0x1a00(R15)) 610, the register number (base-register) of the base register is set in the variable (code-base-register). Moreover, when the processing in Step S305, which is shown in detail in FIG. 5, is performed on the second indirect branch instruction 608, "0x:−d00" is set in the variable (code-base-register-offset). For this reason, in Step S407 the dynamic compiler 124 determines whether the third indirect branch instruction 610 causes page boundary crossing, by determining whether a value obtained by adding the value "0x:−d00" of the variable (code-base-register-offset) and the displacement "0x:1a00" is not smaller than zero and is smaller than the memory size (0x:1000) of one virtual page.

In this embodiment, in the processing in Step S407 the value obtained by adding the value "0x:−d00" of the variable (code-base-register-offset) and the displacement "0x:1a00" is "0x:d00". Thus, the dynamic compiler 124 determines that the third indirect branch instruction 610 does not cause page boundary crossing, and executes the aforementioned optimization processing in Step S408.

Figure 7:
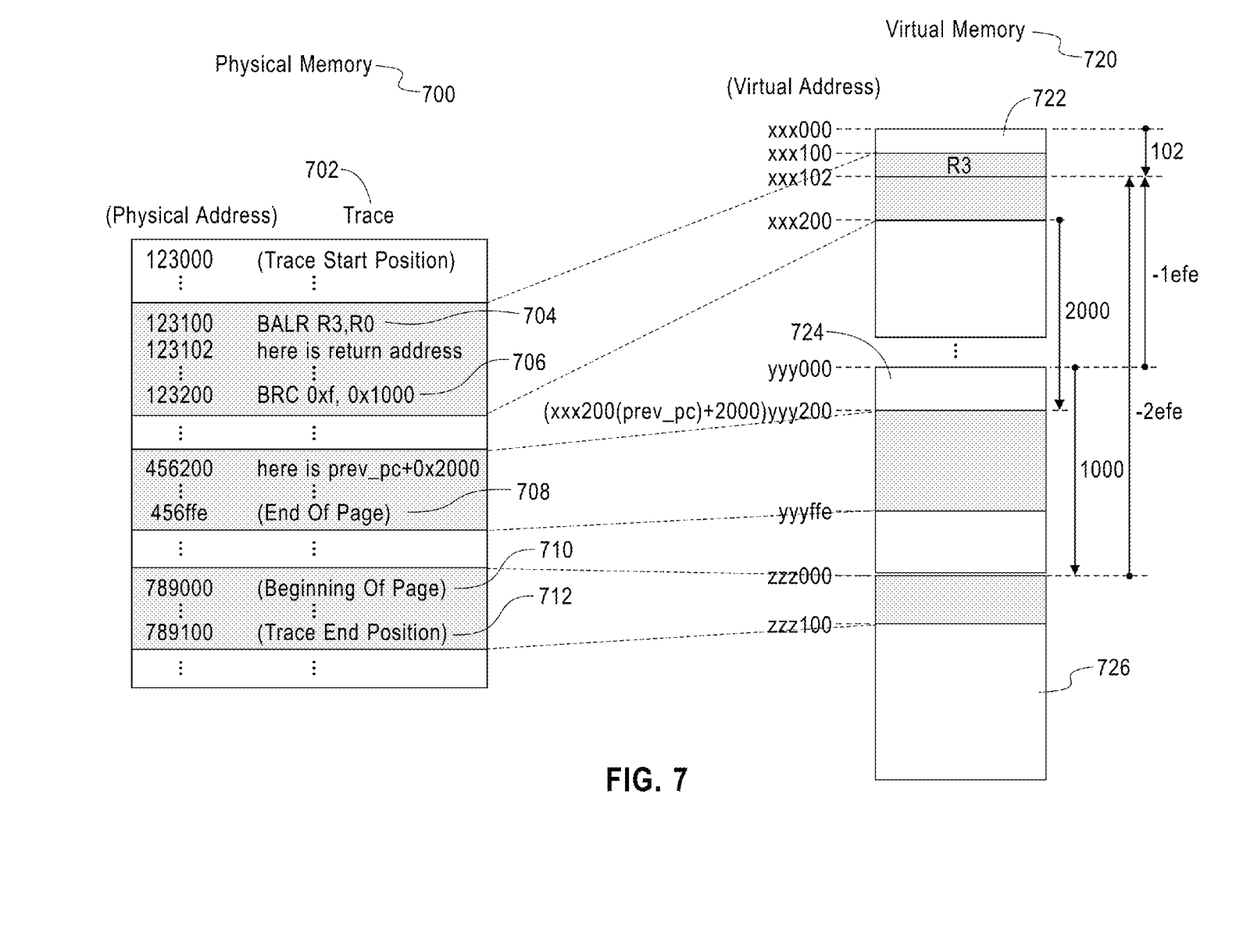
FIG. 7 is a conceptual diagram showing another embodiment of the physical and virtual memory mapping executed by the virtual machine of the present invention.

FIG. 7 is a conceptual diagram showing another embodiment of the physical and virtual memory mapping executed by the virtual machine of the present invention. Herein below, mapping of a physical memory 700 and a virtual memory 720 of a system emulated by the virtual machine will be described with reference to FIG. 7.

When a trace 702, which constitutes processing target machine code, is executed the trace 702 is loaded to the physical memory 700. Specifically, the physical address (0x:123000), the physical address (0x:456000), and the physical address (0x:789000), which are in the physical memory 700, are respectively mapped to the start address (0x:xxx000) of the virtual page 722, the start address (0x:yyy000) of the virtual page 724, and the start address (0x:zzz000) of the virtual page 726 (x, y, and z are any numbers), which are memory areas of the virtual memory 720. In the embodiment shown in FIG. 7, a virtual page (not shown) exists between a virtual page 722 and a virtual page 724. The virtual page 722 does not continue to the virtual page 724. In contrast, the virtual page 724 continues to a virtual page 726. Note that where a memory address is mapped varies at every run of the program.

The first instruction in the trace 702 is loaded at the physical address (0x:123000) in the physical memory 700, and thus the trace 702 starts at the physical address (0x:123000). A second instruction (BALR R3, R0) 704, which is a non-taken-call-type instruction, is loaded at the physical address (0x:123100). By executing the first instruction, a return address (0x:xxx102), which is a virtual address next to a virtual address that corresponds to the physical address (0x:123100), is set as a set value (R3) of a return register. Here, the second instruction 704 does not cause the branching processing.

Referring to FIG. 5, when the trace 702 is compiled in Step S501 the dynamic compiler 124 branches the processing to Step S503 because the second instruction (BALR R3, R0) 704 falls under the non-taken-call-type instruction. In Step S503, the dynamic compiler 124 sets the register number (return-register) of the return register in the variable (code-base-register). In addition, the dynamic compiler 124 assigns a value "0x:102", which is 12 lower bits of the set value (R3) of the return register, to the variable (code-base-register-offset). The value "0x:102" of the variable (code-base-register-offset) corresponds to an offset between a virtual address (0x:xxx102), which is the set value (R3) of the return register, and the start address (0x:xxx000) of the virtual page 722 that includes the virtual address (0x:xxx102).

Furthermore, a third instruction (BRC 0xf, 0x1000) 706, which is a relative branch instruction, is loaded to the physical memory 700 at a physical address (0x:123200). It is predicted that execution of the third instruction 706 causes the processing to branch to the physical address (0x:456200). Here, the BRC is an instruction specific to z/Architecture. The processing is moved to a virtual address obtained by adding a value "0x:2000" and a virtual address to which the instruction is allocated. Note the value "0x:2000" is two times as large as "0x:1000" designated by a parameter. Specifically, the processing is branched to a virtual address (0x:yyy200) obtained by adding "0x:2000" and a virtual address (0x:xxx200) in the virtual page 722 corresponding to the physical address (0x:123200), which is a branch source.

Since another virtual page (not shown) exists in this embodiment between the virtual page 722 as the branch source and the virtual page 724 as a branch target, the value obtained by adding the virtual address (0x:xxx200) as the branch source and "0x:2000" is the virtual address (0x: yyy200), which is the branch target.

When the trace 702 is compiled in Step S501 the dynamic compiler 124 branches the processing to Step S504 because the third instruction (BRC 0xf, 0x1000) 706 is a relative branch instruction. In Step S504, the dynamic compiler 124 computes a value "0x:2000" by multiplying the number of page boundaries the third instruction 706 crossed by the memory size of one virtual page. This value is computed using the function of page-increment-by-((current-physical-pc-on-trace&0xff)+displacement). Then, the dynamic compiler 124 assigns to the variable (code-base-register-offset) a value obtained by subtracting the multiplication value from a value set as the variable (code-base-register-offset). Since "0x:102" has been set in the variable (code-base-register-offset) by the second instruction 704 in Step S504, the dynamic compiler 124 assigns to the variable (code-base-register-offset) a value "0x:−1efe", which is obtained by subtracting the multiplication value "0x:2000" from the value "0x:102" of the variable (code-base-register-offset).

By executing the instruction loaded at the physical address (0x:456ffe) of the physical memory 700, which is an end 708 of the page, the processing is moved to the physical address (0x:789000) at the beginning 710 of the next physical page and the processing in the virtual memory 720 is moved to the start address (0x:zzz000) of the virtual page 726, which is a page next to the virtual page 724 that includes a virtual address (0x:yyyffe) corresponding to the physical address (0x:456ffe). The processing is terminated at a virtual address (0x:zzz100) corresponding to the physical address (0x:789100). Thereafter, subsequent processing (not shown) are executed in order, and terminated at the physical address (0x:789100), which is an end position 712 of the trace 702.

When the trace 702 is compiled in Step S501 the dynamic compiler 124 branches the processing to Step S505 because the compilation target instruction is an instruction present at the page end. In Step S505, the dynamic compiler 124 assigns, to the variable (code-base-register-offset), the value obtained by subtracting the memory size (0x:1000) of one virtual page from the value set as the variable (code-base-register-offset). Since "0x:−1efe" has been set in the variable (code-base-register-offset) by the third instruction 706, which is the relative branch instruction, the dynamic compiler 124 assigns in Step S505 a value "0x:−2efe" to the variable (code-base-register-offset). This value is obtained by subtracting the memory size "0x:1000" from the value "0x:−1efe" of the variable (code-base-register-offset).

Although having been described above by using the embodiment, the present invention is not limited to the embodiment described above, but can be changed within a range in which those skilled in the art can conceive of by changing or deleting functional means in this embodiment or adding another functional means. Any modes thus made should be included in the scope of the present invention, as long as these modes provide the same operations and advantageous effects as those of the present invention.

The invention claimed is:

1. A compiling method executed by an information processing apparatus for compiling a trace comprising the steps of:
generating an intermediate code from said trace, which is an instruction sequence described in machine language;
computing an offset between (i) an address value, which is a base point of an indirect branch instruction, and (ii) a start address of a memory page, which includes a virtual address referred to by said information processing apparatus, wherein said virtual address is referred to immediately after processing a first instruction contained in said intermediate code, wherein the computing comprises computing an offset of said first instruction by subtracting a memory size of one memory page from an offset of an instruction preceding said first instruction;
determining whether a second indirect branch instruction, which is subsequent to said first instruction, causes processing to jump from a memory page that includes said second indirect branch instruction to another memory page by using a value obtained from adding said offset to a displacement made by said second indirect branch instruction, wherein the determining step obtains a result; and
optimizing said intermediate code, using said result of the determining step, by deleting from said intermediate code processing of determining whether said second indirect branch instruction causes page boundary crossing, and by deleting from said intermediate code processing of updating a program counter of said information processing apparatus if it is determined that processing does not jump from said memory page that includes said second indirect branch instruction to another memory page;
wherein at least one of the steps is carried out by said information processing apparatus.

2. The compiling method according to claim 1, wherein the determining step comprises:
determining that processing does not jump from a memory page that includes an indirect branch instruction to another memory page, if a value obtained from adding said offset to a displacement made by said indirect branch instruction is equal to or greater than zero and smaller than a memory size of one memory page; and
determining that processing does jump from a memory page that includes an indirect branch instruction, if a value obtained from adding said offset to a displacement made by said indirect branch instruction is less than zero or larger than a memory size of one memory page.

3. The compiling method according to claim 1, wherein the step of computing comprises:
computing said offset by subtracting a displacement of an indirect branch instruction from a part of an address value predicted as a branch target of said indirect branch instruction, if said first instruction is said indirect branch instruction; and
computing said offset as a part of an address value predicted as a callee of a call-type instruction, if said first instruction is said call-type instruction.

4. The compiling method according to claim 1, wherein the step of computing comprises computing an offset of said first instruction by subtracting a value from an offset of an instruction preceding said first instruction;
wherein said value is obtained by multiplying a total number of page boundaries said first instruction crosses by a memory size of one memory page.

5. The compiling method according to claim 1, further comprises:
determining whether an instruction to be compiled is an indirect branch instruction with no index register, and
if said instruction to be compiled is said indirect branch instruction with no index register, determining whether said indirect branch instruction with no index register causes processing to jump from a memory page that includes said indirect branch instruction no index register to another memory page.

6. An article of manufacture tangibly embodying in computing hardware computer readable instructions which, when implemented, cause an information processing apparatus to execute a compiling method for compiling a trace, comprising the steps of:
- generating an intermediate code from said trace, which is an instruction sequence described in machine language;
- computing an offset between (i) an address value, which is a base point of an indirect branch instruction, and (ii) a start address of a memory page, which includes a virtual address referred to by said information processing apparatus, wherein said virtual address is referred to immediately after processing a first instruction contained in said intermediate code, wherein the step of computing comprises computing an offset of said first instruction by subtracting a memory size of one memory page from an offset of an instruction preceding said first instruction;
- determining whether a second indirect branch instruction, which is subsequent to said first instruction, causes processing to jump from a memory page that includes said second indirect branch instruction to another memory page by using a value obtained from adding said offset to a displacement made by said second indirect branch instruction, wherein the determining step obtains a result; and
- optimizing said intermediate code, using said result of the determining step, by deleting from said intermediate code processing of determining whether said second indirect branch instruction causes page boundary crossing, and by deleting from said intermediate code processing of updating a program counter of said information processing apparatus, if it is determined that processing does not jump from said memory page that includes said second indirect branch instruction to another memory page.

7. The article of manufacture according to claim 6, wherein the determining step comprises:
- determining that processing does not jump from a memory page that includes an indirect branch instruction to another memory page, if a value obtained by adding said offset to a displacement made by said indirect branch instruction is equal to or greater than zero and smaller than a memory size of one memory page; and
- determining that processing does jump from a memory page that includes an indirect branch instruction, if a value obtained by adding said offset to a displacement made by said indirect branch instruction is less than zero or larger than a memory size of one memory page.

8. The article of manufacture according to claim 6, wherein the step of computing comprises:
- computing said offset by subtracting said displacement from part of an address value predicted as a branch target of an indirect branch instruction, if said first instruction is said indirect branch instruction; and
- computing said offset as a part of an address value predicted as a callee of a call-type instruction, if said first instruction is said call-type instruction.

9. The article of manufacture according to claim 6, wherein the step of computing comprises computing an offset of said first instruction by subtracting a value from an offset of an instruction preceding said first instruction;
- wherein said value is obtained by multiplying a total number of page boundaries said first instruction crosses by a memory size of one memory page.

10. The article of manufacture according to claim 6, further comprises:
- determining whether an instruction to be compiled is an indirect branch instruction with no index register; and
- if said instruction to be compiled is said indirect branch instruction with no index register, determining whether said indirect branch instruction with no index register causes processing to jump from a memory page that includes said indirect branch instruction with no index register to another memory page.

11. An information processing apparatus comprising computing hardware for compiling a trace comprising:
- an interpreter configured to generate intermediate code from said trace, which is an instruction sequence described in machine language; and
- a dynamic compiler configured to compile intermediate code, wherein said dynamic compiler comprises an optimization processor configured to:
- compute an offset between (i) an address value, which is a base point of an indirect branch instruction, and (ii) a start address of a memory page, which includes a virtual address referred to by said information processing apparatus, wherein said virtual address is referred to immediately after processing a first instruction contained in said intermediate code, wherein said optimization processor computes an offset of said first instruction by subtracting a memory size of one memory page from an offset of an instruction preceding said first instruction;
- determine whether a second indirect branch instruction, which is subsequent to said first instruction, causes processing to jump from a memory page that includes said second indirect branch instruction to another memory page by using a value obtained from adding said offset to a displacement made by said second indirect branch instruction, wherein said optimization processor obtains a result; and
- optimize said intermediate code, using said result, by deleting from said intermediate code processing of determining whether said second indirect branch instruction causes page boundary crossing, and by deleting from said intermediate code processing of updating a program counter of said information processing apparatus, if it is determined that processing does not jump from said memory page that includes said second indirect branch instruction to another page.

12. The information processing apparatus according to claim 11, wherein:
- said optimization processor determines processing does not jump from said memory page that includes said second indirect branch instruction to another memory page, if said value obtained by adding said offset to said displacement is equal to or greater than zero and smaller than a memory size of one memory page; and
- said optimization processor determines processing does jump from said memory page that includes said indirect branch instruction to another memory page, if said value obtained by adding said offset and said displacement is less than zero or greater than a memory size of one memory page.

13. The information processing apparatus according to claim 11, wherein:
- said optimization processor computes said offset by subtracting a displacement of an indirect branch instruction from a part of an address value predicted as a branch target of said indirect branch instruction, if said first instruction is said indirect branch instruction; and
- said optimization processor computes said offset as a part of an address value predicted as a callee of a call-type instruction, if said first instruction is said call-type instruction.

14. The information processing apparatus according to claim 11, wherein:

said optimization processor computes an offset of said first instruction by subtracting a value from an offset of an instruction preceding said first instruction, wherein said value is obtained by multiplying a total number of page boundaries said first instruction crosses by a memory size of one memory page.

15. The information processing apparatus according to claim 11, wherein:

said optimization processor determines whether an instruction to be compiled is an indirect branch instruction with no index register; and if said instruction to be compiled is said indirect branch instruction with no index register, said optimization processor determines whether processing jumps from a memory page that includes said indirect branch instruction with no index register to another memory page.

\* \* \* \* \*